United States Patent [19]

Schirmer

[11] 3,955,040
[45] May 4, 1976

[54] POLYAMIDE FILM LAMINATE WITH ENTRAPPED LIQUID

[75] Inventor: Henry George Schirmer, Spartanburg, S.C.

[73] Assignee: W. R. Grace & Co., Duncan, S.C.

[22] Filed: May 24, 1974

[21] Appl. No.: 473,106

Related U.S. Application Data

[62] Division of Ser. No. 327,358, Jan. 29, 1973, Pat. No. 3,874,967.

[52] U.S. Cl. .............................. 428/474; 428/538; 428/520; 428/516; 428/411; 428/414; 428/518; 428/507; 426/127; 426/129
[51] Int. Cl.² .......................................... B32B 27/34
[58] Field of Search .......... 264/95, 173, 209, 210 R, 264/129–131, 270; 161/227, 182, 254; 156/145, 146, 244, 308; 428/411, 414, 520, 516, 474, 522, 423, 538

[56] References Cited
UNITED STATES PATENTS

| | | | |
|---|---|---|---|
| 3,340,091 | 9/1967 | Zweig | 264/129 X |
| 3,397,263 | 8/1968 | Werner | 264/216 |
| 3,558,330 | 1/1971 | Widiger et al. | 161/254 X |
| 3,595,735 | 7/1971 | Tyrrell | 161/254 X |
| 3,600,267 | 8/1971 | McFedries, Jr. et al. | 161/254 X |
| 3,651,200 | 3/1972 | Kuga et al. | 264/209 |
| 3,661,695 | 5/1972 | Berliner | 161/254 X |
| 3,705,659 | 12/1972 | Mackie | 161/254 X |
| 3,799,167 | 3/1974 | Miller | 128/287 |

*Primary Examiner*—William J. Van Balen
*Assistant Examiner*—Patricia C. Ives
*Attorney, Agent, or Firm*—John J. Toney; William D. Lee, Jr.; Richard G. Jackson

[57] ABSTRACT

In coextruded or extrusion coated, laminated, polymeric films which have been stretched by the inflated bubble technique, liquid can be entrapped between the collapsed bubble walls and can migrate to an interior layer of the laminate to treat same when the layer adjacent to the entrapped liquid is liquid permeable. For example, in a polyethylene/nylon/ethylene vinyl acetate/entrapped water/ethylene vinyl acetate/nylon/polyethylene laminated film the entrapped water will diffuse through the ethylene vinyl acetate layers to keep the nylon layers plasticized and impact resisitant.

5 Claims, 2 Drawing Figures

POLYAMIDE FILM LAMINATE WITH ENTRAPPED LIQUID

This is a division of application Ser. No. 327,358 filed Jan. 29, 1973, now U.S. Pat. No. 3,874,967.

FIELD OF THE INVENTION

This invention relates to improved, laminated, polymeric films and the method for preparing same. In particular, the invention relates to laminated films having at least one interior layer of nylon and to a film structure and process for keeping said nylon layer plasticized and impact resistant.

BACKGROUND OF THE INVENTION

In the prior art it is quite common to treat a polymeric material after its formation in order to improve its useful characteristics. Some of the better known treatments include exposure of the film to various forms of radiation, heat treatments including quenching, stretching, buffing, immersion in various chemical liquids, exposure to gaseous mediums, coating and lamination, etc. However, once a film has been coated and made the interior layer of a laminate it has heretofore been difficult, if not impossible, to further treat the interior layer. Accordingly, one object of the present invention is to provide a process for treating the interior layer of a laminate.

One reason why a film may be coated or laminated before treatment is completed is that it is often more economical to coextrude several layers of a tubular material in a single die or in a series of coextrusion dies and then stretch the coextruded tubing into film thicknesses. This way the film need only be handled once and all layers will be uniformly stretched and, in some instances, uniformly oriented. However, further treatment of an interior layer is not readily accomplished and it is another object of the present invention to provide a method of treating interior layers of a coextruded or extrusion laminated film.

In the prior art it has been found that the properties of nylon or polyamide film will improve beneficially with treatment by or exposure to water. For example, in U.S. Pat. No. 3,397,263 a process is disclosed for steam treating chill-cast nylon film to remove structural irregularities such as uneven film thicknesses. Likewise, in U.S. Pat. No. 3,651,200 a method is disclosed for orienting nylon film while it simultaneously adsorbs water. Therefore, it is still another object of the present invention to provide a method whereby a laminate having an interior layer of nylon may be beneficially treated with water.

The foregoing and many other objects will become obvious to those skilled in the art from the following summary and description of the invention.

SUMMARY OF THE INVENTION

In one aspect, the present invention is a method of treating a polymeric film laminate having a treatable layer by laminating a permeable layer to the treatable layer and thereafter exposing the permeable layer to a treating substance which will diffuse through the permeable layer thereby treating the treatable layer. Thus, in another aspect, the present invention is a laminate which includes a treatable layer, a treating substance, and a layer permeable to said treating substance interposed between said treatable layer and the treating substance. A preferred treatable layer comprises an amide polymer and a preferred treating substance is water.

In still another aspect, the present invention is a process for treatment of an interior layer of a polymeric film laminate by a liquid by preparing a laminated, tubular, film, the inner layer of the tubular film being liquid permeable and adjacent to the interior layer to be treated; providing a set of adjustable pinch rolls; inflating said tubular film in a vertical position whereby the lower end of said tube is closed off by said pinch rolls which collapse said tube; providing and maintaining a reservoir of liquid in the collapsed end of said tube; and, adjusting said pinch rolls to allow liquid to become entrapped between the collapsed walls of said tube. Collapsing means other than pinch rolls can also be employed. For example, shoes or guides could be used to bring the walls of the tube close together to trap a liquid therebetween and allow a controlled amount of liquid to pass through the collapsing means. In addition, the inside of a tube could be sprayed with the desired treating substance. A preferred inner layer to be treated comprises an amide polymer, the treating liquid comprises water, and the liquid permeable layer of said laminate comprises either an ethylene vinyl acetate copolymer or an ethylene acrylic acid copolymer.

As used herein, the terms "polymer" and "polymeric" include polymers, ionomers, copolymers, homopolymers, and block or graft polymers. The present invention can be applicable generally to those materials whose properties are improved by further treatment and can include, but is not limited to, the polymers of the olefins, amides, vinyl chloride, vinylidene chloride and, in addition, the cellulosic materials and the thermosetting materials.

Treatment of the treatable material includes treatment with plasticizers. Depending upon the material to be treated, recognized plasticizers can include water, aliphatic glycols, aliphatic esters, aromatic esters, aromatic phlthalates and epoxies.

Other treatments than plasticizing can include treatment to reduce ultraviolet sensitivity, increase flame retardency, and improve stability. In addition, a dye or pigment receptive inner layer of a laminate could be dyed or pigmented through a layer permeable to a solvent which carries the dye or pigment.

DESCRIPTION OF THE DRAWINGS

In the drawings which are attached hereto and a part hereof.

PREFERRED EMBODIMENT

Figure 1:
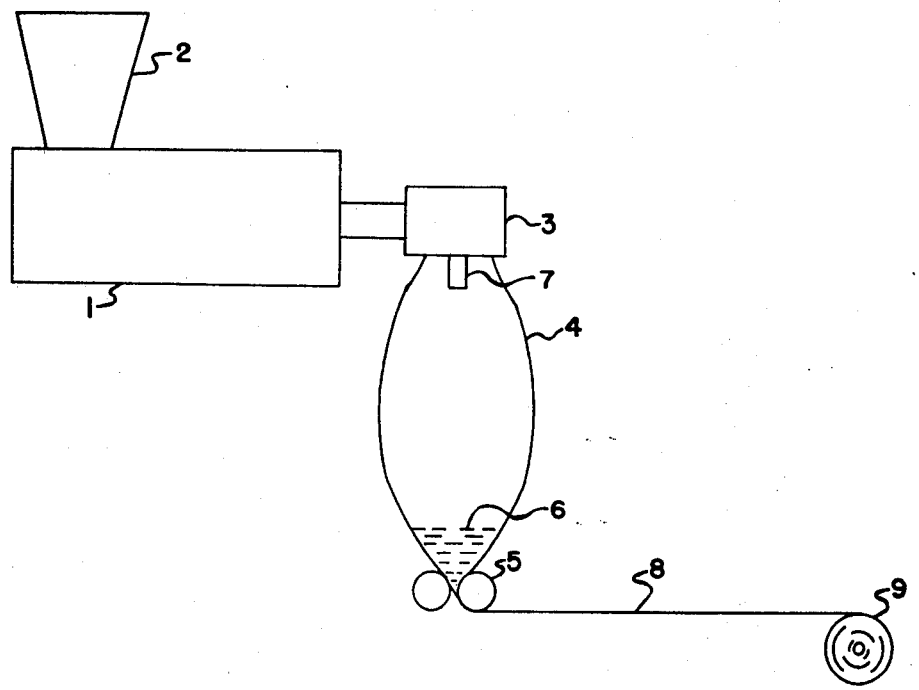
FIG. 1 is a schematic representation of the preferred embodiment of the process of the present invention; and, FIG. 2 is a schematic representation of the preferred embodiment of a laminate according to the present invention.

Referring first to FIG. 1, extruder 1 having feed hopper 2 with coextrusion die 3 is shown. In actuality, additional extruders would be provided for each different laminate material which is fed to coextrusion die 3. Thus, for example, if a laminate of nylon, polyethylene, and ethylene vinyl acetate were desired, three extruders would usually be used and they would be arranged around the coextrusion die 3 to feed to the die their respective streams of molten material. All of this is within the skill of the art.

After leaving the circular coextrusion die 3 the tubular laminate is expanded into bubble 4. The extrusion die 3 is arranged so that the interior layer of the bubble 4 is permeable to the liquid 6 or "sock" as such liquid reservoir is referred to in the art. It is within the skill of the art to extrude from a coextrusion die 3 a multi-ply tube having as the layer on its inside a material such as ethylene vinyl acetate copolymer or an ethylene acrylic acid copolymer; and, in the preferred embodiment, these layers will be adhered to an adjacent layer of an amide polymer. The bubble 4 is created by expanding the coextruded tube while it is still molten and soft by compressed air and collapsing or trapping the bubble between adjustable pinch rollers 5. The sock 6 or liquid reservoir can be provided through nozzle 7. The adjustable rollers 5 can be adjusted so that a film-like water layer is trapped between the collapsed walls of the bubble 4 as it forms the finished laminate 8. Preferably, the sock 6 is acqueous and the laminate coating adjacent the water permeable inner layer is the nylon to be treated. The collapsed bubble 8 or film is wound onto wind-up roll 9 to complete the process.

Instead of the coextrusion process as described above, a tubular substrate of permeable material can be provided and passed through a circular extrusion die which extrusion coats the layer to be treated onto the permeable layer. Thereafter, the thus formed tubular laminate can be heated to its softening temperature and expanded into a bubble which is again collapsed between pinch rollers which support and entrap liquid sock 6. Also, the process of the present invention can be carried out by providing a treatable film which preferably comprises an amide polymer and laminating a permeable layer which preferably comprises a copolymer of ethylene vinyl acetate to the polyamide layer and thereafter exposing the ethylene vinyl acetate layer to water which will diffuse through that layer to the amide layer. It is preferred to apply the water or treating substance in a film-like layer and trap it between two permeable layers each of which is adjacent to a layer to be treated.

Also within the scope of the invention is a liquid sock 6 which has gases dissolved within it and the permeable layer is permeable to the dissolved gas so that the gas may migrate through the permeable layer to the adjacent laminate layer which is to be treated. Also, a gaseous suspension could be substituted for liquid sock 6 and the pressure within the bubble could be used to increase the diffusion of the treating gas through a gas permeable layer into the interior layer which is to be treated by the gas.

Figure 2:
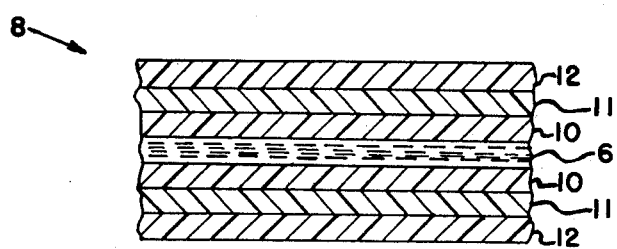

Turning now to FIG. 2 which shows a preferred laminate construction according to the present invention, the treating substance or entrapped liquid 6 is shown between two layers 10 which are permeable to the treating substance. The layers 10 are positioned adjacent layers 11 which are the layers to be treated by the liquid 6 which diffuses through the permeable layers 10. Additional layers 12 can be added for protection or strength as desired.

In the preferred construction, the treating substance 6 comprises water, the permeable layers 10 comprise either an ethylene vinyl acetate copolymer or an ethylene acrylic acid copolymer and the layers 11 to be treated comprise an amide polymer.

EXAMPLE 1

Five standard extruders were arranged to feed a six ply circular extrusion die. The first extruder fed the extrusion orifice for the outer ply with molten polyethylene; the second die fed the second orifice with molten ethylene acrylic acid copolymer; the third extruder fed the third and fourth extrusion orifices with molten amide polymer; the fourth extruder fed the fifth extrusion orifice with molten ethylene acrylic acid; and the fifth extruder fed the sixth or inner extrusion die orifice with molten ethylene vinyl acetate copolymer. The six ply tube was extruded downwardly and a bubble was created by inflating the tube with compressed air. The bubble was trapped wih pinch rollers and sock or water was then added which also was trapped by the adjustable pinch rollers. The wall of the bubble thined down to the desired film thickness of 1.0 mils and, when collapsed, with the water entrapped between the bubble walls, the film width was 31 inches. Approximately four pounds of water for each 100 lbs. of film was added.

Film was also produced according to the method of the foregoing paragraph but without the addition of the entrapped water. Thereafter ground beef was packaged in both the wet and dry film. When subjected to high impact loading by slaming a ground beef package against a table top, the dry film packages split open whereas the wet film packages simply elongated.

It is believed that the presence of water which diffuses through the ethylene vinyl acetate layer and the ethylene acrylic acid layers to the nylon plasticizes the nylon thereby improving its impact resistance.

EXAMPLE 2

Using extruders and a circular, multi-ply extrusion die as in Example 1 above, the laminated film stretched by the bubble technique was produced having the following tubular wall construction: polyethylene/ethylene acrylic acid copolymer/polyamide/ethylene acrylic acid copolymer. The polyethylene layers were on the outside of the tube or bubble and the ethylene acrylic acid copolymer layer was on the inside. When collapsed, the water layer of film was entrapped between the water permeable ethylene acrylic acid copolymer layers so that the water could diffuse to the nylon layers. Approximately the same quantity of water was used as in Example 1 to create the entrapped layer. A similar test showed that the impact resistance of this polyamide laminate was improved by the water treatment the same as in Example 1.

I claim:
1. A polyamide film laminate comprising:
   a. a laminated, stretched, flattened tube, said flattened tube including:
      1. an inner layer of a liquid permeable, polymeric material selected from the group consisting of an ethylene vinyl acetate copolymer or an ethylene acrylic acid copolymer,
      2. a polyamide layer adjacent said inner layer and disposed outwardly thereof; and,
   b. a layer of treating liquid entrapped by said inner layer of permeable material and forming a central layer in the laminate resulting from said flattened tube, said liquid being diffusible through said permeable layer to the surface of said polyamide layer and said layers being insoluble in said treating liquid.

2. The laminate of claim 1 wherein said liquid is water.

3. The laminate of claim 1 including a polyethylene layer disposed outwardly of said polyamide layer.

4. The laminate of claim 2 wherein said permeable layer is an ethylene vinyl acetate copolymer.

5. The laminate of claim 2 wherein said permeable layer is an ethylene acrylic acid copolymer.

* * * * *